(12) United States Patent
Henningson et al.

(10) Patent No.: US 9,725,000 B2
(45) Date of Patent: Aug. 8, 2017

(54) SYSTEM AND METHOD FOR MONITORING REMOTE BATTERY CHARGING

(71) Applicant: PH Ingenuities, LLC, Lowell, AR (US)

(72) Inventors: Dale B. Henningson, Manti, UT (US); Bruce A. Purkey, Lowell, AR (US)

(73) Assignee: Purkey's Fleet Electric, Inc., Lowell, AR (US)

( * ) Notice: Subject to any disclaimer, the term of this patent is extended or adjusted under 35 U.S.C. 154(b) by 0 days.

(21) Appl. No.: 14/619,379

(22) Filed: Feb. 11, 2015

(65) Prior Publication Data

US 2016/0121737 A1    May 5, 2016

Related U.S. Application Data

(60) Provisional application No. 62/073,653, filed on Oct. 31, 2014.

(51) Int. Cl.
*H02J 7/00* (2006.01)
*B60L 11/18* (2006.01)

(52) U.S. Cl.
CPC ....... *B60L 11/1809* (2013.01); *B60L 11/1851* (2013.01); *Y02T 10/7005* (2013.01); *Y02T 90/168* (2013.01); *Y04S 30/12* (2013.01)

(58) Field of Classification Search
CPC .................................................... Y02T 90/14
USPC ........................................................ 320/109
See application file for complete search history.

(56) References Cited

U.S. PATENT DOCUMENTS

| | | | | |
|---|---|---|---|---|
| 4,389,608 | A * | 6/1983 | Dahl | H02J 7/022 320/137 |
| 4,823,086 | A | 4/1989 | Whitmire | |
| 7,498,687 | B2 | 3/2009 | Kinsey | |
| 7,619,417 | B2 | 11/2009 | Klang | |
| 7,642,743 | B1 | 1/2010 | Nolan | |
| 8,004,242 | B1 * | 8/2011 | Purkey | B60R 16/033 320/130 |
| 8,335,062 | B2 * | 12/2012 | Haines | H02H 3/00 320/109 |
| 8,437,908 | B2 | 5/2013 | Goff | |
| 8,450,982 | B2 * | 5/2013 | Matsuda | H02J 7/0091 320/150 |
| 8,670,885 | B2 * | 3/2014 | Gilman | B60W 50/0097 340/425.5 |
| 2009/0103341 | A1 * | 4/2009 | Lee | H02J 7/022 363/124 |
| 2010/0241320 | A1 | 9/2010 | Lugash | |

(Continued)

*Primary Examiner* — Yalkew Fantu
(74) *Attorney, Agent, or Firm* — Gallian, Welker & Beckstrom, L.C.; Robert A. Gurr

(57) ABSTRACT

In one embodiment, a system for monitoring and indicating remote battery charging comprises a sensor unit, a power source, at least one remote battery, and a wiring harness; wherein the sensor unit comprises an analog to digital converter (an "A/D Converter") and a display means such as lights (e.g., LEDs) and/or a screen (e.g., LCD). In one method of use, the system for monitoring then monitors the power supply (the source) as well as the auxiliary charging system (e.g., the liftgate electrical system) and provides advanced warnings or signals when the system is not receiving sufficient power or is otherwise not functioning properly.

14 Claims, 7 Drawing Sheets

(56) References Cited

U.S. PATENT DOCUMENTS

| | | | |
|---|---|---|---|
| 2011/0006731 A1* | 1/2011 | Wang | B60L 11/1816 320/109 |
| 2011/0144823 A1* | 6/2011 | Muller | B60L 3/04 700/297 |
| 2011/0298422 A1* | 12/2011 | Failing | B60L 3/00 320/109 |
| 2012/0013175 A1* | 1/2012 | Newman, Jr. | B60R 16/033 307/9.1 |
| 2012/0086395 A1* | 4/2012 | Kim | B60L 11/1838 320/109 |
| 2013/0015005 A1* | 1/2013 | Koga | B60L 7/26 180/6.5 |
| 2013/0231808 A1 | 9/2013 | Flath | |

\* cited by examiner

SYSTEM AND METHOD FOR MONITORING REMOTE BATTERY CHARGING

CROSS-REFERENCE TO RELATED APPLICATIONS

This application claims the benefit of U.S. Provisional Application Ser. No. 62/073,653, filed on Oct. 31, 2014, which is incorporated herein by reference.

TECHNICAL FIELD

The present disclosure relates to methods and systems for monitoring electrical systems. More specifically, the present disclosure relates to monitoring remote batteries (batteries located a significant distance from the charging source) and their charging systems (cables and/or battery chargers).

BACKGROUND

In the trucking industry, remote batteries located on a trailer have traditionally been charged by coupling the electrical system of the truck to the remote batteries (e.g., liftgate electrical system) by using large cables and connections. An example of this is a dual-pole connection between the tractor and the trailer. Because of the long distance, the voltage drops in the cables and in the connection causes a reduction in the power that can be delivered to the liftgate batteries. This results in batteries that do not get optimally charged and therefore may not function as well or last as long as would be expected or needed. To improve the charging of remotely located batteries, the prior art has incorporated battery chargers (e.g., DC-DC converters). These DC-DC converters have been utilized in the trucking industry for several years to charge auxiliary batteries (e.g., liftgate batteries) that are located a distance from the vehicle's main electrical system. One method of charging the liftgate batteries is disclosed in U.S. Pat. No. 8,004,242 ("System and method for managing distribution of vehicle power in a multiple battery system"), which is incorporated herein by reference in its entirety. The benefits of properly charging batteries to their function and life is well-known and documented. With or without a DC-DC converter, the liftgate charging system could cease to function properly due to the effects of aging, wear, or damage. It requires very little electrical energy to lower a liftgate, but it requires a significant amount of energy to raise a liftgate. Because of this fact, when a liftgate electrical system fails, the result is often a liftgate that is stuck in the lowered position, which can prevent the vehicle from being moved. When this happens, it can be very expensive, in both direct and indirect costs, to remedy the problem.

Therefore, there remains a need for a system that can monitor battery charging systems. There is a further need to not only monitor, but to extend the life of the systems being monitored. Even more, in a system with multiple power sources, there is a need to not only charge auxiliary batteries, but to also monitor and display the status of the various electrical components involved, and, ideally, select the best source for charging the auxiliary batteries. The present invention solves these and other problems.

SUMMARY OF EXAMPLE EMBODIMENTS

In one embodiment, a system for monitoring and indicating remote battery charging comprises a sensor unit, a power source, at least one remote battery, and a wiring harness; wherein the sensor unit comprises an analog to digital converter (an "A/D Converter") and a component status indicator such as lights (e.g., LEDs) and/or a screen (e.g., LCD). In one method of use, the system for monitoring then monitors the power supply (the source) as well as the auxiliary charging system (e.g., the liftgate electrical system) and provides advanced warnings or signals when the system is not receiving sufficient power or is otherwise not functioning properly.

In another embodiment, a system for indicating power status and improving charging of remote batteries comprises a sensor unit, a battery charger (e.g., DC-DC converter), and a switch for engaging or disengaging the power source. In one method of use, the system monitors the electrical power system, optimally switches the charger on or off depending upon the health and status of the power source, and displays the status to a user.

In another embodiment, a system for indicating power status and improving charging of remote batteries comprises a sensor unit, a battery charger (e.g., DC-DC converter), and a means for switching between power sources to boost the voltage to optimally charge the batteries; wherein the means for switching between power sources comprises that disclosed in U.S. Pat. No. 8,004,242. In one method of use, the system monitors the electrical power system, optimally switches between power sources, and displays the status to a user via a component status indicator.

DETAILED DESCRIPTION OF EXAMPLE EMBODIMENTS

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to any included drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

Figure 1:
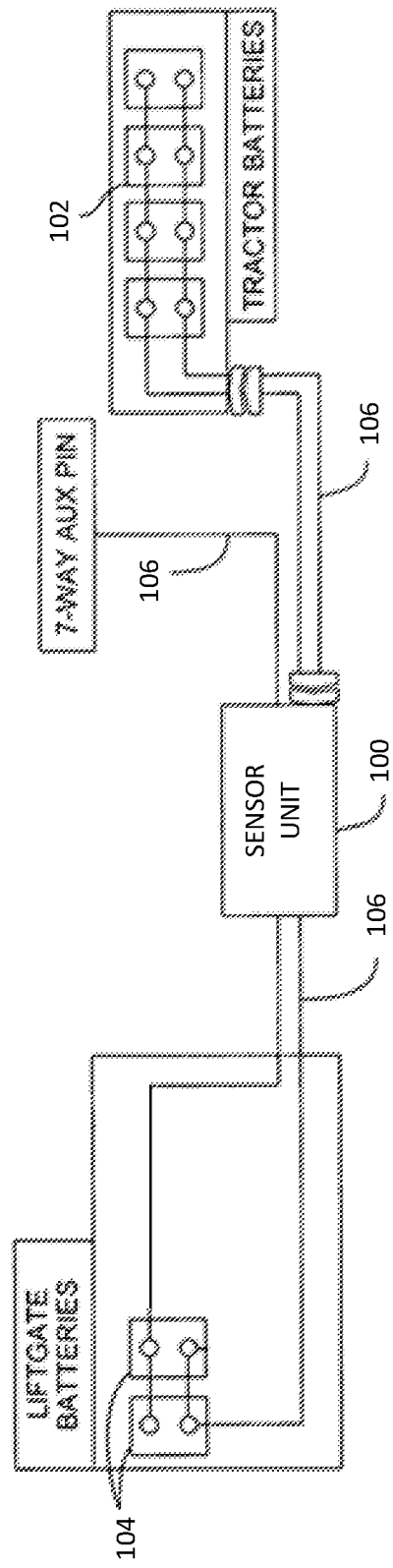
FIG. 1 is a schematic view of a system for monitoring and indicating remote battery charging.
Figure 2B:
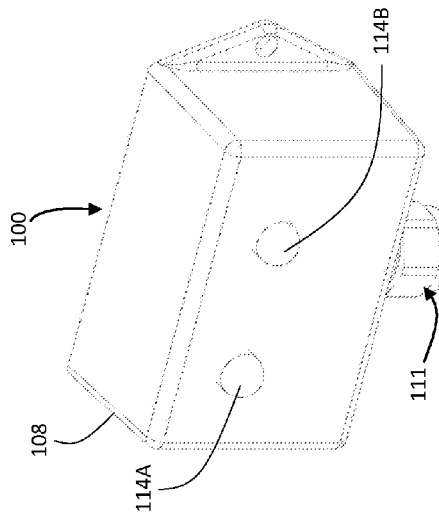
FIG. 2B is a perspective view of a sensor unit for a system for monitoring and indicating remote battery charging.
Figure 2D:
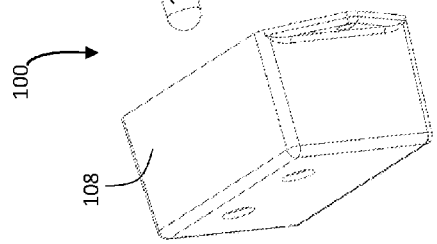
FIG. 2D is an exploded view of a sensor unit for a system for monitoring and indicating remote battery charging.
Figure 2A:
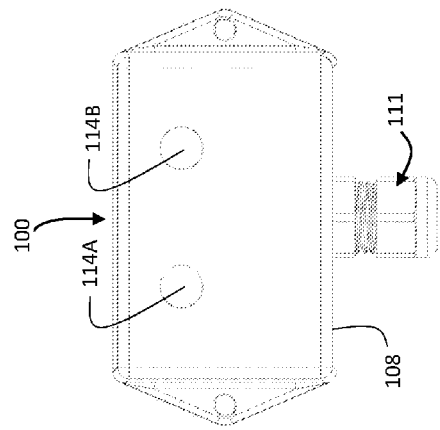
FIG. 2A is a front view of a sensor unit for a system for monitoring and indicating remote battery charging.
Figure 2C:
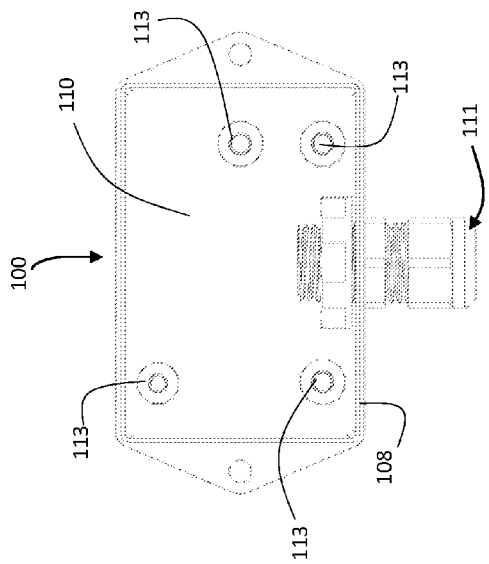
FIG. 2C is a back, open plan view of a sensor unit for a system for monitoring and indicating remote battery charging.

In one embodiment, as generally illustrated in FIG. 1, a system for monitoring and indicating remote battery charging comprises a sensor unit 100, a power source 102, at least one remote battery 104, and a wiring harness 106; wherein the sensor unit 100, as best seen in FIGS. 2A-2D, is comprised of a housing 108, a voltage sensing means (e.g., an analog to digital converter) and a logic control means embedded on circuit board 110, a component status indicator (for user notification), such as lights 114A, 114B (e.g., light-emitting diodes (LED)), and a wire channel 111. The logic control means may be achieved through circuitry, such as by using logic gates, but may also be achieved by using a comparator, microcontroller, or other equivalent means. As shown in FIG. 2D, various wire connection posts 113 connect the sensor unit to the various components in the system. It will be appreciated that while LEDs are shown throughout the drawings, other component status indicators may be used for user notification, such as analog and digital gauges, liquid crystal display (LCD) screens, and their equivalents. In one method of use, a user will connect the sensor unit 100 to the power system to be monitored (e.g., the liftgate power system). The sensor unit 100 then monitors the status of the power using an analog to digital converter ("A/D Converter") coupled to a microcontroller (or other comparing means) to turn on or off the appropriate LED 114A, 114B, such as to indicate that there is low voltage at the power source or, alternately, at the liftgate. The microcontroller compares two signals and when the battery signal drops below the reference signal, the microcontroller will indicate to the operator via the LED 114A, 114B that the battery is low. The voltage reference may be a zener diode Z3 to provide a precision voltage reference for the A/D converter coupled to the microcontroller on circuit board 110. This allows a user to have an advanced warning that there could be a possible power failure during use. For example, if the user notes that there is a warning indication light for the liftgate battery, the user may choose not to lower the liftgate until the issue has been resolved; otherwise, the liftgate battery may not provide sufficient power to raise the liftgate. The component status indicators may indicate the status/condition of a remote battery, the power source, the cables, the charger and other components. This is accomplished by measuring the voltage (e.g., using an A/D converter) before, during, and after use of a component. In such a manner, it is possible to determine the health of the overall power system.

Figure 3:
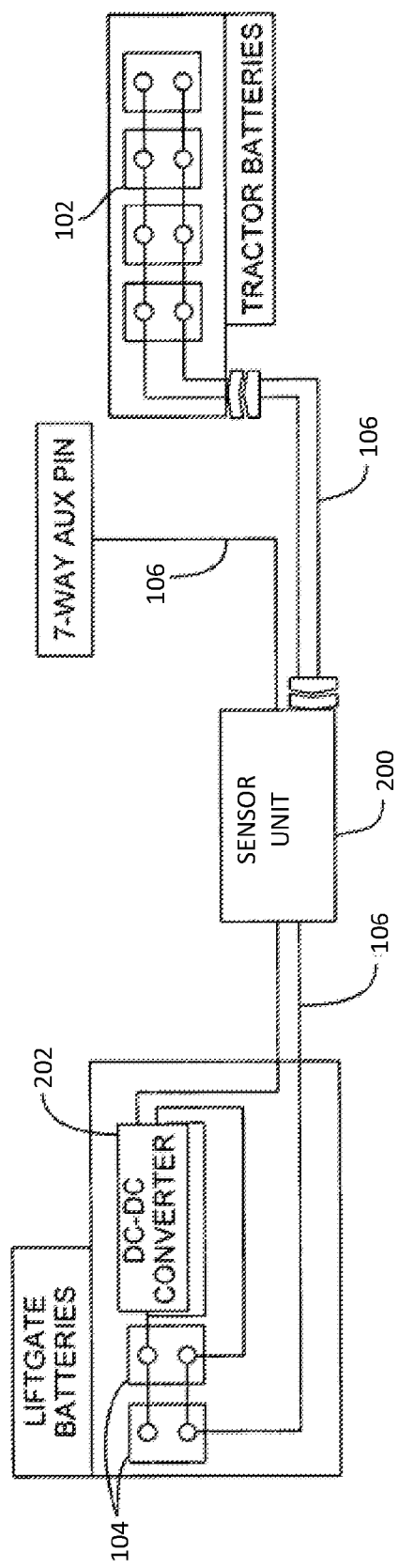
FIG. 3 is a schematic view of a system for indicating power status and improving charging of remote batteries in a vehicle.
Figure 4B:
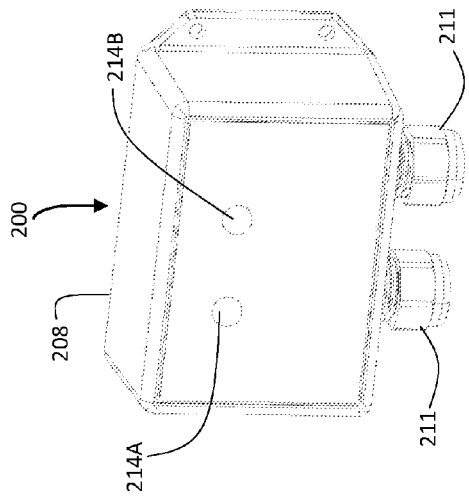
FIG. 4B is a perspective view of a sensor unit for a system for indicating power status and improving charging of remote batteries in a vehicle.
Figure 4D:
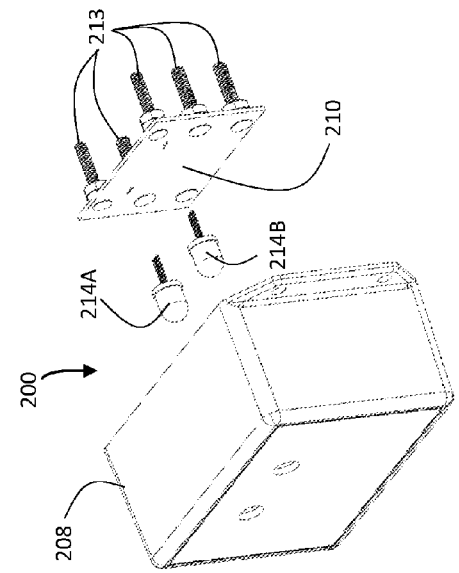
FIG. 4D is an exploded view of a sensor unit for a system for indicating power status and improving charging of remote batteries in a vehicle.
Figure 4A:
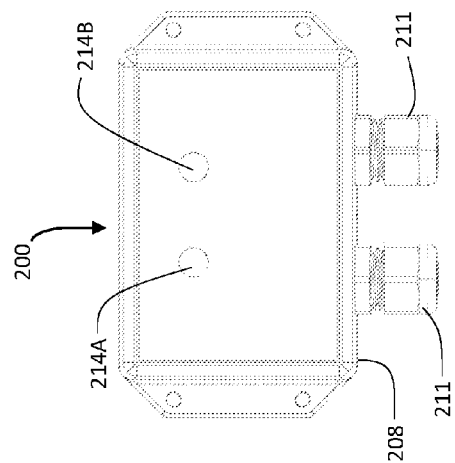
FIG. 4A is a front view of a sensor unit for a system for indicating power status and improving charging of remote batteries in a vehicle.
Figure 4C:
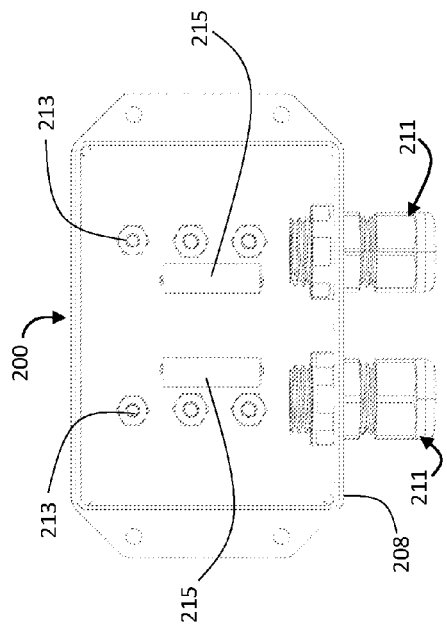
FIG. 4C is a back, open plan view of a sensor unit for a system for indicating power status and improving charging of remote batteries in a vehicle.

In another embodiment, as generally shown in FIG. 3, a system for indicating power status and improving charging of remote batteries 104 comprises a sensor unit 200 with a means to turn on or off a battery charger 202 (e.g., DC-DC Converter), a power source 102, and a wiring harness 106; wherein the sensor unit 200, as best seen in FIGS. 4A-4D, is comprised of a housing 208, an analog to digital converter and a logic control means embedded on a circuit board 210, a status indicator, such as lights 214A, 214B (e.g., light-emitting diodes (LED)), preferably at least one fuse 215, and at least one wire channel 211. Wire connection posts 213 are used to connect the sensor unit to the various electrical components of the system. The means for turning on or off the battery charger may be a switch (e.g., electromagnetic or solid-state relays) controlled by the logic control means (e.g., microcontroller) based on voltage levels. For example, in one method of use, a system for indicating power status and improving charging, monitors the electrical power system via sensor unit 200, optimally switches the battery charger 202 on or off (using known methods) depending upon the health and status of the power source 102, and displays the status of the various components (e.g., power source, remote battery, etc.) to a user via a component status indicator 214A, 214B. This allows maximum charging of remote batteries 104 without compromising the source power 102. For example, if the remote batteries 104 are being charged by the tractor batteries 102, as the tractor batteries 102 fall below a certain threshold—such as that required to start the tractor—then the sensor unit 200 would display the appropriate indicator 214A or 214B (e.g., LED light), and would also switch off the battery charger 202. In this manner, a user may monitor the status of the batteries 102, 104 in the system and know when a battery 102, 104 may need to be replaced.

Further, the current disclosure teaches a system that allows the remote batteries to be optimally charged when the trailer is decoupled from the tractor. For example, in the examples illustrated earlier, the power source may be the reefer power system instead of the tractor power system (e.g., tractor batteries, alternator, etc.). This method allows the reefer battery to charge the liftgate batteries to an optimal level without compromising the reefer power system. For example, once the reefer battery falls below a predetermined threshold (e.g., 11.0 volts), the charger is switched off and the indicator lights on the sensor unit would be appropriately illuminated.

Figure 5:
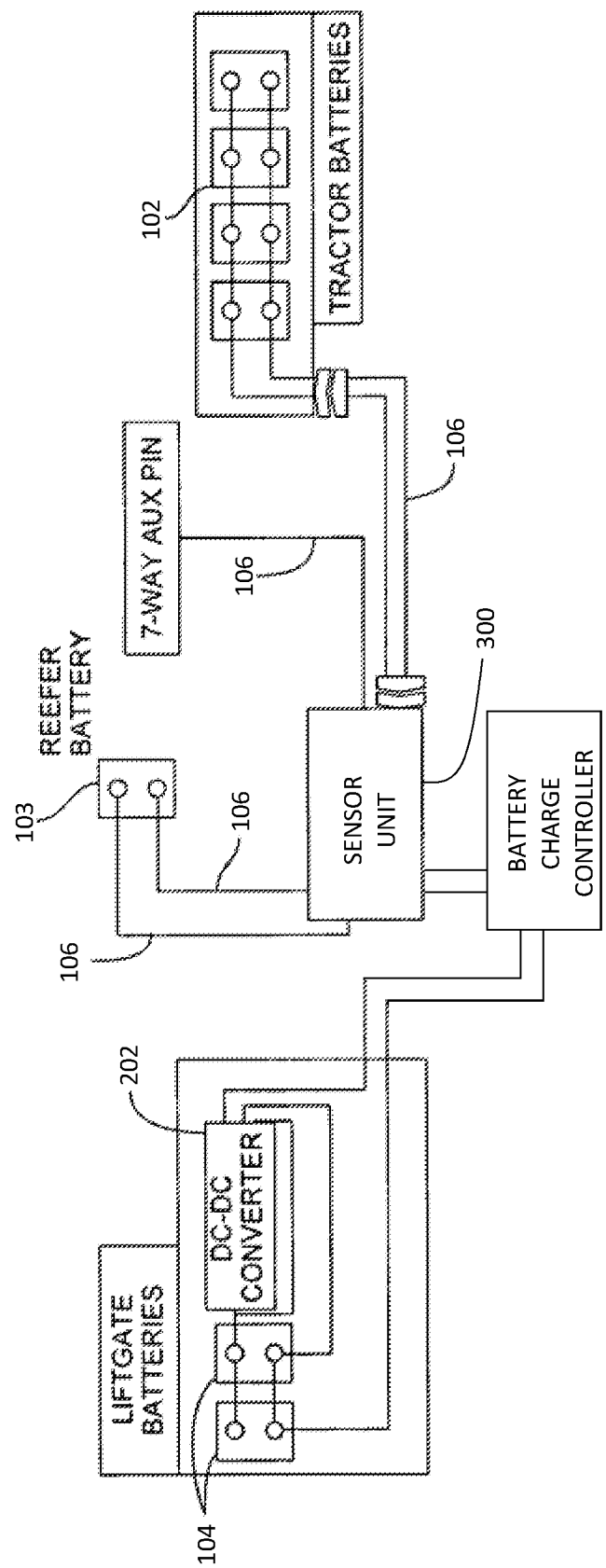
FIG. 5 is a schematic view of a system for indicating power status and improving charging of remote batteries in a system with more than one power source.
Figure 6A:
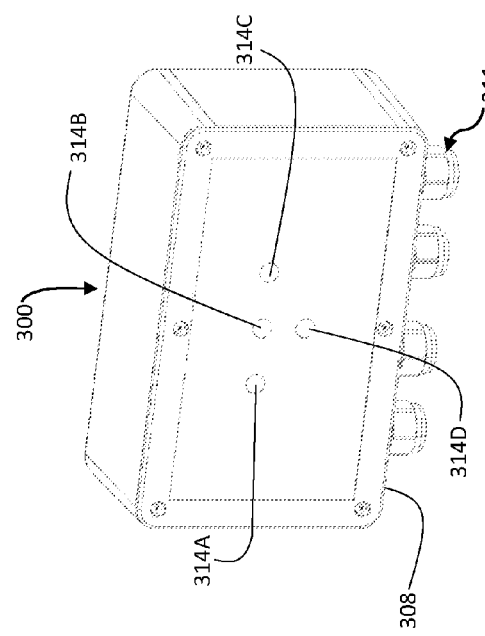
FIG. 6A is a front view of a sensor unit for a system for indicating power status and improving charging of remote batteries in a system with more than one power source.
Figure 6B:
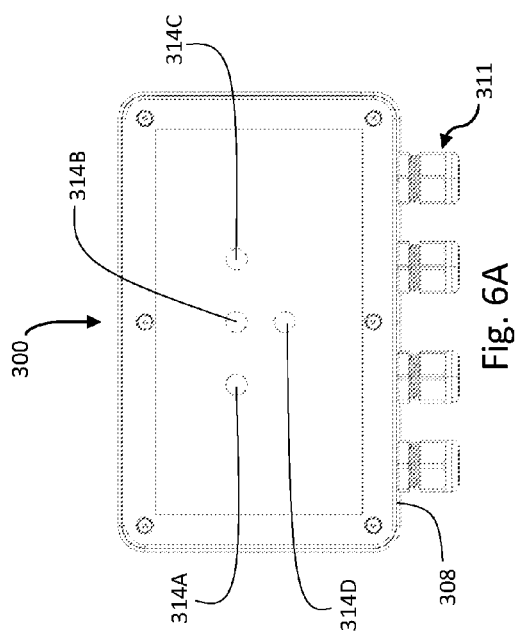
FIG. 6B is a perspective view of a sensor unit for a system for indicating power status and improving charging of remote batteries in a system with more than one power source.
Figure 6C:
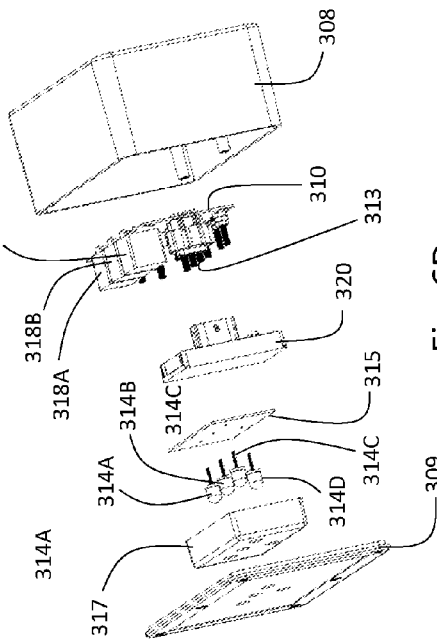
FIG. 6C is a back, open plan view of a sensor unit for a system for indicating power status and improving charging of remote batteries in a system with more than one power source.
Figure 6D:
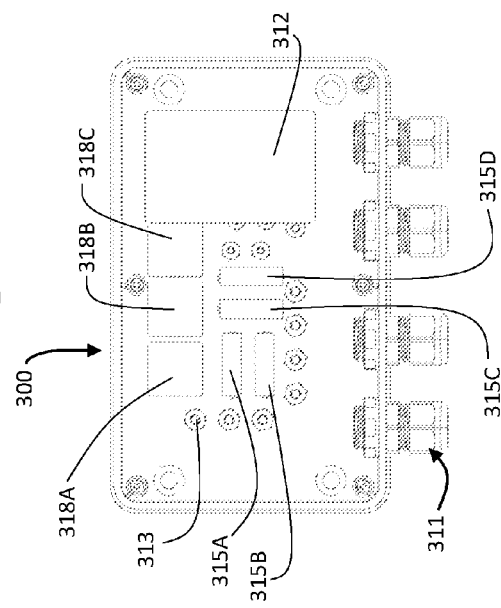
FIG. 6D is an exploded view of a sensor unit for a system for indicating power status and improving charging of remote batteries in a system with more than one power source.
Figure 7:
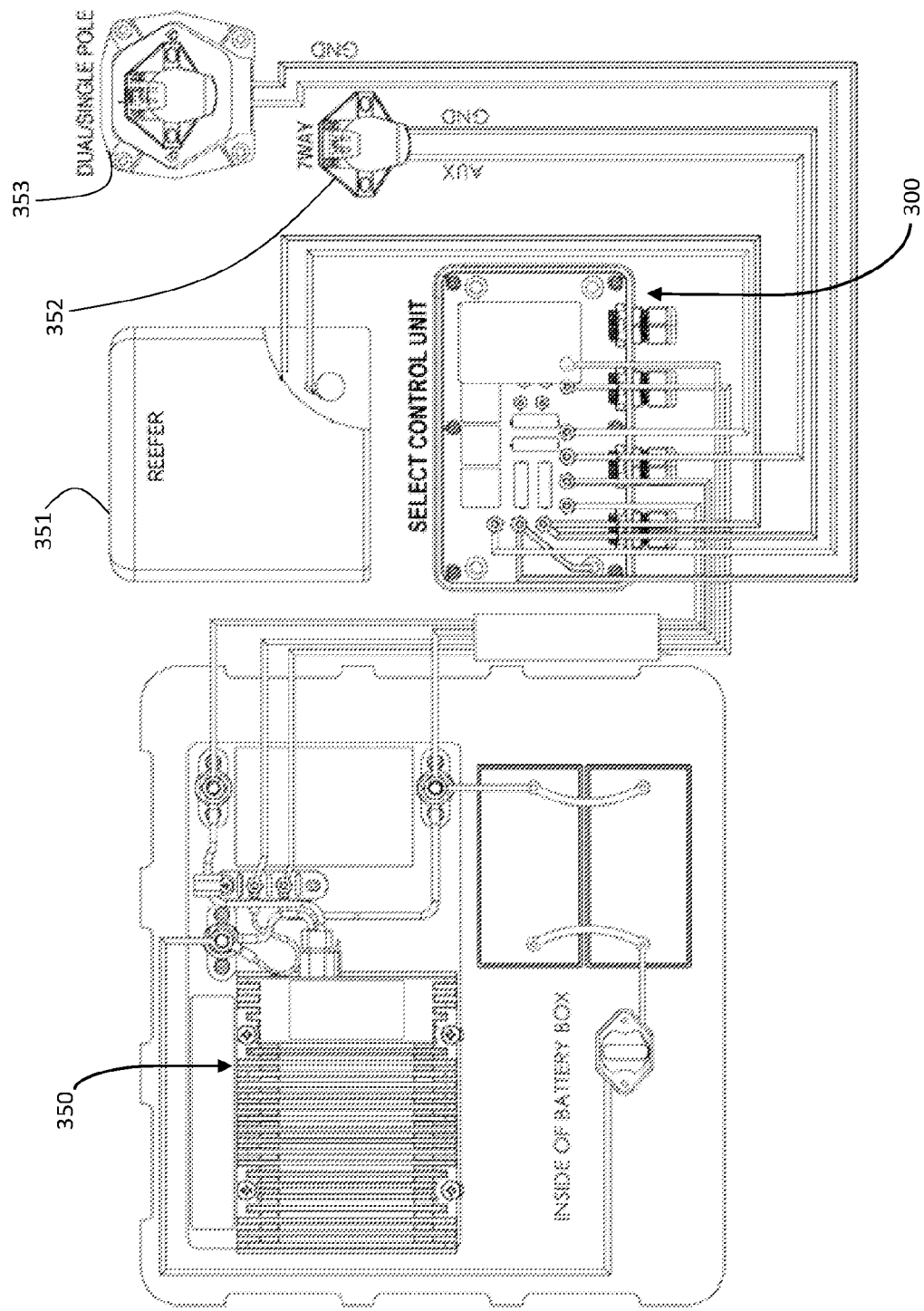
FIG. 7 is a schematic view of a system for indicating power status and improving charging of remote batteries in a system with more than one power source coupled with a battery charge controller.

In another embodiment, as generally shown in FIG. 5, a system for indicating power status and improving charging by selecting the best source, comprises a sensor unit 300, a battery charger 202 (e.g., DC-DC Converter), a first power source 102 and at least one second power source 103 (e.g., reefer batteries), a wiring harness 106, and a means for switching between power sources; wherein the sensor unit 300, as best seen in FIGS. 6A-6D, is comprised of a housing 308, a circuit board 310 with an analog to digital converter and least one logic control means, a component status indicator, such as a plurality of lights 314A-314D (e.g., light-emitting diodes (LED)), one or more fuses 315A-315D, one or more relays 318A-C, a control module 320 (e.g., microprocessor-based 12-pin module), and at least one wire channel 311. The housing 308 may further comprise a removable cover 309. As seen in FIGS. 6C and 6D, sensor unit 300 also comprises wire connection posts 313 as well as LED circuit board 315 with LED housing 317. In one embodiment, the means for switching between power sources comprises the "Battery Charge Controller" as disclosed in U.S. Pat. No. 8,004,242, entitled "System and method for managing distribution of vehicle power in a multiple battery system," and likewise referred to herein as the "battery charge controller." In one embodiment, as illustrated in the schematic in FIG. 7, sensor unit 300 is electrically coupled to a battery charge controller 350 and the vehicle electrical system generally illustrated as connections 351, 352, 353. In one method of use, a system for indicating power status and improving charging by selecting the best source monitors the electrical power system or systems in a vehicle, optimally switches between power sources using battery charge controller 350, and displays the status of the power systems to a user via the component status indicators. By utilizing such a system, the batteries can receive additional charge time, thereby increasing the amount of time the batteries can be utilized and/or decreasing the depth of discharge to the batteries. In cold temperatures, batteries also require a higher voltage to get fully charged. The DC-DC converter (or equivalent charger) compensates for temperature as well as for the voltage drops in the connections and cables and gets the best voltage to the remotely located batteries (e.g. liftgate). The result is well charged liftgate batteries that will last longer and that will have ample power for liftgate operation (or any other remotely operated system). As the battery ages with time, or if a cable becomes corrupted, the user indicators will alert the user, allowing them to remedy the problem before it causes damage and/or losses in time and money. In other words, based on the drop in voltage, the health of the remote batteries can be determined. This may be accomplished by measuring the voltage of the remote batteries before and during operation.

The same is true for other components in the system, such as the power source. For example, the system can monitor the voltage levels at the power source and indicate to a user (via LEDs or LCD screen, for example) the battery condition, the condition of the cables, or whether there is a blown fuse. This can be determined by simply comparing the voltage without current flowing to the voltage with current flowing.

In one embodiment, it is also possible to determine the state of the battery charger (i.e., active, not active, fault) and to turn it on or off. For example, if the charger fails to come on when the voltage level is low in the system, then the sensor unit can indicate that status to the user using the same methods previously described herein. Further, if the voltage levels from all power sources are too low to accommodate charging of the remote batteries, the sensor unit can turn off the charger (e.g., DC-DC converter). In the alternative, the charger itself may comprise a microcontroller that would control the on or off capability of the charger. This is important so as to not damage the power sources and/or to allocate a sufficient amount of power to other systems, such as the antilock braking system. For example, by monitoring the voltage of the auxiliary pin in the system, the sensor unit can reduce or disable the battery charger if a certain minimum threshold is reached.

The same results can be achieved in a system incorporating a battery charge controller. If the voltage falls below a predetermined threshold, the battery charge controller will reduce or deactivate the charging system. Once at least one of the power sources is at a sufficient level, the battery charge controller will activate and commence charging of the remote batteries. Another benefit of incorporating the battery charge controller is the ability to select between multiple power sources. In other words, if the tractor batteries are below the minimum threshold, the system will select the reefer batteries and/or alternator.

What is claimed is:

1. A system located on a vehicle for monitoring and indicating the battery status of the vehicle and for monitoring and indicating the battery status and charging status of a remotely located battery on the vehicle, comprising: a sensor unit on the vehicle electrically coupled to a power source onboard the vehicle and at least one remote battery on the wherein the sensor unit comprises a housing, a voltage sensing means, a logic control means, and a component status indicator comprising LEDs or an LCD;
   wherein the voltage sensing means measures the voltage of the power source and the at least one remote battery with current flowing;
   wherein the voltage sensing means measures the voltage of the power source and the at least one remote battery without current flowing;
   wherein the logic control means compares the voltage measured by the voltage sensing means with predetermined reference value and outputs a result to a user via the LEDs or LCD of the component status indicator, at least one of
   (a) a battery condition;
   (b) a condition of the cables;
   (c) a blown fuse; or
   (d) an on/off status of a battery charger.

2. The system of claim 1, wherein the voltage sensing means comprises an analog to digital converter.

3. The system of claim 1, wherein the logic control means comprises a comparator.

4. The system of claim 1, wherein the logic control means comprises a microcontroller.

5. The system of claim 1, further comprising the battery charger onboard the vehicle and a means for switching said battery charger on or off.

6. The system of claim 5, wherein the means for switching the battery charger on or off comprises a relay controlled by the logic control means in response to voltage levels of the power source and the remote battery.

7. The system of claim 5, wherein the battery charger comprises a DC-DC converter.

8. The system of claim 1, wherein the power source is a tractor battery.

9. A system located on a vehicle for indicating power status and improving charging of remote batteries on the vehicle, comprising:
   a sensor unit on the vehicle electrically coupled to a first power source on the vehicle, a second power source on the vehicle, and a battery charger onboard the vehicle; the battery charger being further electrically coupled to a remote battery on the vehicle; wherein the sensor unit comprises a component status indicator having one or more LEDs or an LCD, and a means for switching between power sources to optimally charge the remote battery of the vehicle based upon voltage levels of the first and second power sources; and
   wherein via the LEDs or LCD, the component status indicator indicates to a user, based upon predetermined reference value of a logic control means, at least one of
   (a) a battery condition;
   (b) a condition of the cables;
   (c) a blown fuse; or
   (d) an on/off status of a battery charger.

10. The system for indicating power status and improving charging of remote batteries of claim 9, wherein the means for switching between power sources comprises a battery charge controller comprising a microprocessor-based control module including a voltage comparator, a communications system, and electrical switching devices to selectively open and close electrical circuits to manage current flow to the remote batteries.

11. The system for indicating power status and improving charging of remote batteries of claim 9, wherein the battery charger comprises a DC-DC converter.

12. The system for indicating power status and improving charging of remote batteries of claim 9, wherein the sensor unit selectively reduces the battery charger based upon a predefined voltage value measured at an auxiliary pin.

13. The system for indicating power status and improving charging of remote batteries of claim 9, wherein the sensor unit selectively reduces or disables the battery charger based upon a predefined voltage value of the first or second power source or combination thereof.

14. The system for indicating power status and improving charging of remote batteries of claim 9, wherein the sensor unit disables the battery charger based upon a predefined voltage value measured at an auxiliary pin.

* * * * *